United States Patent [19]
Peterson, Jr.

[11] Patent Number: 5,852,539
[45] Date of Patent: Dec. 22, 1998

[54] OVERHEAT CIRCUIT FOR A UTILITY VEHICLE

[75] Inventor: Rudolph Andrew Peterson, Jr., Beaver Dam, Wis.

[73] Assignee: Deere & Company, Moline, Ill.

[21] Appl. No.: 670,867

[22] Filed: Jun. 26, 1996

[51] Int. Cl.⁶ .................................................. H02H 5/04
[52] U.S. Cl. .............................. 361/25; 361/27; 361/103; 361/106
[58] Field of Search ................................ 361/25, 27, 58, 361/103, 106; 180/53.1, 53.5

[56] References Cited

U.S. PATENT DOCUMENTS

| | | | |
|---|---|---|---|
| 4,410,924 | 10/1983 | Hewitt | 361/25 |
| 4,662,472 | 5/1987 | Christianson et al. | 180/53.5 |

*Primary Examiner*—Jeffrey A. Gaffin
*Assistant Examiner*—Sally C. Medley

[57] ABSTRACT

An overheat protection circuit includes a resistor having a first lead connected to the engine temperature switch and the power take off (PTO) relay coil circuit. The second lead of the resistor is connected to the output of an interlock circuit to provide an energizing voltage signal to the PTO relay for operation of the PTO driven attachment when preselected operating conditions are present on the vehicle. If for any reason the engine temperature rises above a preselected maximum operating temperature, the engine temperature switch will close and cause the voltage at the second lead to drop below the minimum operating voltage of the PTO relay. The PTO relay deenergizes to remove drive from the attachment. The PTO cannot be reengaged until the engine operating temperature drops below the maximum operating temperature. The resistor preferably is a positive temperature coefficient thermistor to reduce power dissipation through the circuit while the temperature switch is closed and the PTO relay is deenergized.

10 Claims, 1 Drawing Sheet

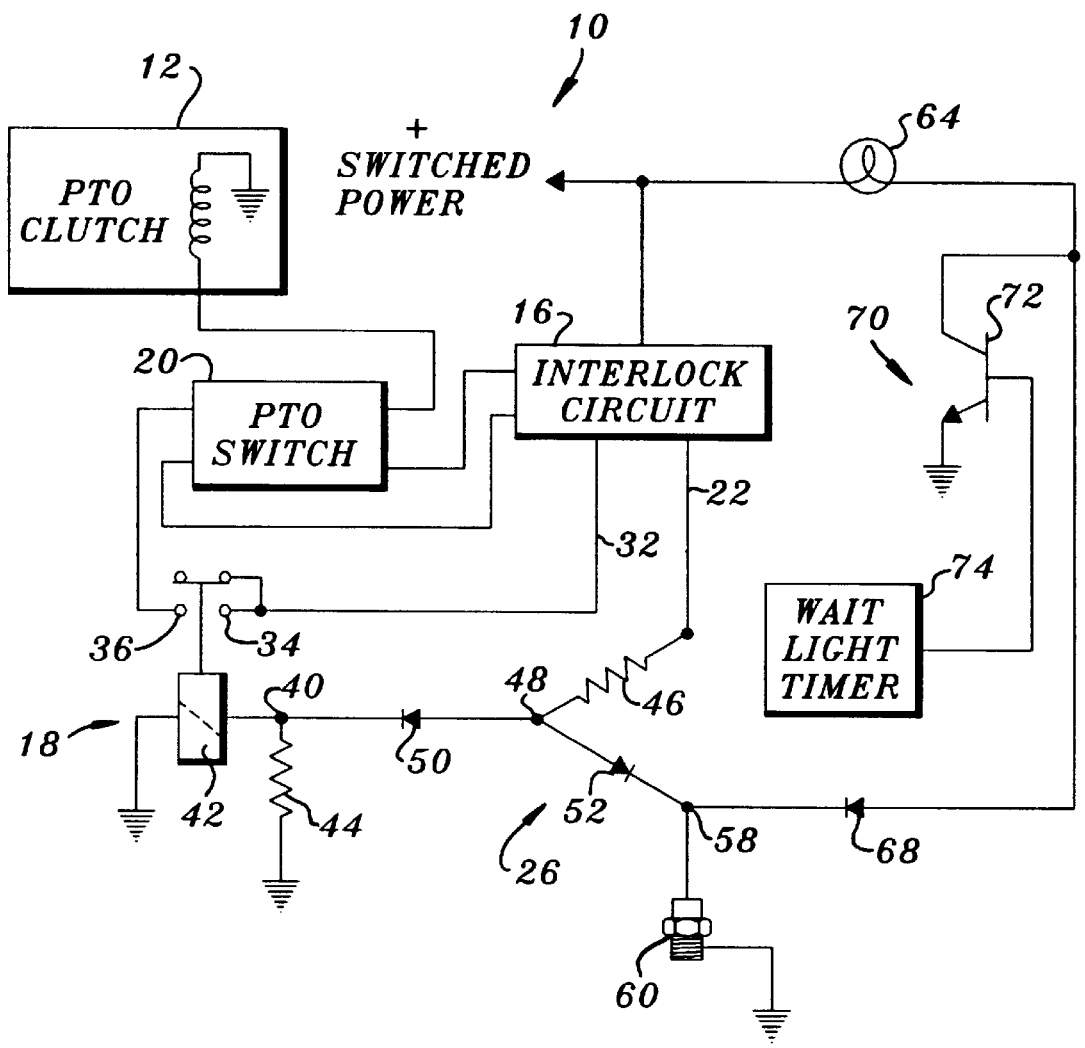

5,852,539

OVERHEAT CIRCUIT FOR A UTILITY VEHICLE

BACKGROUND OF THE INVENTION

1) Field of the Invention

The present invention relates generally to vehicles having powered attachments such as a PTO driven mower and, more specifically, to an overheat protection circuit for such vehicles.

2) Related Art

Vehicles such as tractors having a power take off (PTO) for driving an attachment such as a mower deck often are used under heavy load conditions which can cause engine overheating. To prevent overheating, a conventional overheat protection circuit having a temperature switch in the cooling jacket of the engine is connected to the PTO relay. Under normal operating temperatures, the switch is open so that the relay remains inactivated to permit engagement of the PTO clutch. If the engine temperature rises above a preselected level, the switch closes to activate the relay and disable operation of the PTO until the temperature drops back into the normal operating range. To restart the PTO after the engine cools down, the PTO switch is turned off and then back on again.

The conventional overheat circuit requires an engine temperature relay which adds cost, complexity and weight and reduces the reliability of the system. Adding such a circuit to the wiring harness of an existing system often is a problem. Often, a jumper or relay must be provided in a temperature relay socket for proper operation of the vehicle circuitry.

BRIEF SUMMARY OF THE INVENTION

It is therefore an object of the present invention to provide an improved overheat protection circuit. It is a further object to provide such an improved circuit that overcomes most or all of the aforementioned problems.

It is a further object of the present invention to provide an improved overheat protection circuit which is simple and inexpensive in construction. It is a further object to provide such a circuit which does not require moving parts such as a temperature relay. It is still another object to provide such a circuit which eliminates need for a jumper or relay in a temperature relay socket.

It is still another object of the present invention to provide a simple and inexpensive overheat circuit that can be combined with an existing wiring harness without need for extensive circuit modification. It is still another object to provide such a circuit which is reliable and does not require moving parts such as a temperature relay.

It is another object of the invention to provide an improved overheat protection circuit for a vehicle with a PTO driven attachment which reliably interrupts PTO operation when an engine overheat indication is present. It is a further object to provide such a circuit which does not require a temperature relay and which limits current draw when PTO operation is interrupted.

An overheat protection circuit constructed in accordance with the teachings of the present invention includes a resistor having a first lead connected to the engine temperature switch and the PTO relay coil circuit. The second lead of the resistor is connected to the output of an interlock circuit to provide energizing current to the PTO relay for operation of the PTO driven attachment when preselected operating conditions are present on the vehicle. If for any reason the engine temperature rises above a preselected maximum operating temperature, the engine temperature switch will close and cause the voltage at the PTO relay to drop below the minimum operating voltage of the relay. The PTO relay deenergizes to remove drive from the attachment. The PTO cannot be reengaged until the engine operating temperature drops below the maximum operating temperature. The resistor preferably is a positive temperature coefficient thermistor to reduce power dissipation through the circuit when the temperature switch is closed and the PTO relay is deenergized. A diode is connected between the temperature switch and a wait light circuit.

The circuit is simple and reliable and can replace a conventional engine temperature relay. In some applications, the existing temperature relay socket can be used with the new circuit without requiring a jumper or relay in the socket. The new circuit is simple and facilitates connection of a wiring harness.

These and other objects, features and advantages of the present invention will become apparent to one skilled in the art upon reading the following detailed description in view of the drawings.

BRIEF DESCRIPTION OF THE DRAWINGS

The single drawing figure shows a schematic of circuitry with the overheat protection circuit of the present invention.

DETAILED DESCRIPTION OF THE DRAWINGS

Referring now to the drawing figure, therein is shown a circuit 10 for a vehicle such as a utility tractor having a PTO with an electrically activated PTO clutch 12 for selectively driving an attachment such as a mower deck with the vehicle engine. A conventional interlock circuit 16 is connected to a source of switched power on the vehicle and to a PTO relay circuit 18. The PTO relay 18 is connected to the PTO clutch 12 via PTO on-off switch 20 to provide PTO clutch engagement if preselected vehicle conditions are present when the PTO switch is turned on. Typically, the interlock circuit includes components (not shown) such as an operator presence switch and a parking brake switch.

An output line 22 from the interlock circuit 16 is connected to the relay circuit 18 via overheat responsive circuit 26. A positive voltage is provided to the circuit 26 from the line 22 when certain conditions are met, for example, when the operator is present at a work station on the vehicle and the transmission selector lever is positioned for operation. A switched power line 32 from the interlock circuit 16 normally supplies battery power to one set of inputs 34 on the switched terminals of the relay circuit 18.

A relay output terminal 36 is connected to the PTO switch 20 and connects the line 32 with the PTO clutch 12 when the relay circuit 18 is activated and the switch 20 is turned on. The relay circuit 18 includes a control input 40 connected to one side of a relay coil 42. The opposite side of the relay coil 42 is grounded. A shunt resistor 44, preferably having a resistance on the order of 235 ohms, is connected between the control input 40 and ground. When a voltage above a minimum operating voltage is applied to the control input 40, the relay activates to close the path between the input 34 and the output terminal 36. The minimum operating voltage for the relay circuit 18 is approximately eight volts for a twelve volt system.

The overheat responsive circuit 26 includes a resistor 46 connected between the interlock circuit output line 22 and a terminal 48. A diode 50 is connected between the terminal 48 and the relay control input 40. A blocking diode 52 is connected between the terminal 48 and a terminal 58 on a temperature switch 60 connected to the water jacket of the vehicle engine. When the engine temperature is below a preselected maximum operating temperature, the switch 60 is open. If engine temperature rises above the maximum operating temperature, the switch 60 closes and grounds the terminal 58. The voltage drop across the resistor 46 when the terminal 58 is grounded by the switch 60 is sufficient to cause the voltage at the PTO relay control input 40 to fall below the minimum operating voltage. The relay deactivates and the PTO clutch disengages when the voltage at the input 40 drops below the minimum level.

A wait indicator light 64 has one lead connected to the switched power source and a second lead connected via blocking diode 68 to the temperature switch terminal 58. When the engine temperature rises above the maximum and the switch 60 grounds the terminal 58, the indicator light 64 is illuminated. A wait light timing circuit 70 includes a grounded emitter n-p-n transistor 72 having a collector connected to the second terminal of the light 64 and a base connected to a wait light timing circuit. The timing circuit 70 provides a minimum wait time interval dependent on ambient temperature, and the minimum wait time interval varies directly with temperature.

Preferably the resistor 46 is a high wattage positive temperature coefficient thermistor having a nominal resistance on the order of 40 ohms. The nominal resistance of the thermistor is sufficiently low so that the voltage drop across the resistor during PTO relay activation is small enough to maintain the voltage at the control terminal 40 well above the minimum operating voltage of the PTO relay when the line 22 is powered and the switch 60 is open. If the engine temperature rises above the maximum operating temperature, the switch 60 closes and grounds the terminal 58 to establish a low resistance current path from the terminal 48 to ground through the diode 52. The voltage drop across the thermistor 46 decreases the voltage level at the control input 40 to below the minimum operating voltage and causes the PTO relay and the PTO clutch 12 to deactivate, thereby removing drive from the attachment until the engine cools. The thermistor 46 heats and increases in resistance while the temperature switch 60 is closed to reduce the power consumption of the overheat circuit 26 during PTO shut down. After the engine cools, the switch 60 will again open and permit the PTO relay circuit 18 to be reactivated by turning the PTO switch 20 first to the off position and then back to the on position.

In some applications, the terminal 48 is actually a relay socket for a temperature relay which has been removed and replaced with the overheat circuit 26 of the present invention. The closed path through to the PTO clutch 12 is provided through the socket with the circuit 26 without need for a jumper or a temperature relay.

Having described the preferred embodiment, it will become apparent that various modifications can be made without departing from the scope of the invention as defined in the accompanying claims.

I claim:

1. In a vehicle having an engine and a drive operably connected to a vehicle attachment for powering the attachment from the engine, and an electrically activated drive engagement device for selectively connecting and removing drive from the attachment, an engine overheat protection circuit comprising:

an interlock circuit responsive to one or more vehicle conditions and providing an enabling output signal when preselected vehicle conditions are present;

a temperature switch connected to the engine and having a first state when the engine is below a preselected operating temperature and a second state when the engine is above a maximum operating temperature;

a resistor having a first lead connected to the interlock circuit and a second lead connected to the temperature switch;

a drive relay connected to the drive engagement device and having a minimum activation voltage, the drive relay connected to the second lead; and wherein the enabling output signal provides a voltage to the drive relay above the minimum activation voltage when the temperature switch is in the first state and a voltage below the minimum activation voltage when the temperature switch is in the second state.

2. The as set forth in claim 1 wherein the resistor comprises a thermistor to limit power dissipation when the temperature switch is in the second state.

3. The invention as set forth in claim 1 including a wait indicator connected to a wait indicator timer for providing a preselected wait time interval when the temperature switch changes from the first state to the second state, wherein the wait indicator timer is connected by a first diode to the temperature switch.

4. The invention as set forth in claim 3 wherein the second lead of the resistor is connected by a second diode to the temperature switch.

5. The invention as set forth in claim 3 further including a relay socket for mounting a temperature relay, and wherein the first diode is connected to the socket.

6. In a vehicle having an engine and a power take off (PTO) connected to a vehicle attachment for powering the attachment from the engine, and an electrically activated PTO engagement device for selectively connecting and removing drive from the attachment, an engine overheat protection circuit comprising:

an enabling circuit responsive to one or more vehicle conditions and providing an enabling output signal when preselected vehicle conditions are present;

a temperature switch connected to the engine and having an open state when the engine is below a preselected operating temperature and a closed grounded state when the engine is above a maximum operating temperature;

a resistor having a first lead connected to the enabling circuit and a second lead connected to the temperature switch, the temperature switch grounding the second lead when the engine is above the maximum operating temperature;

a PTO relay connected to the PTO engagement device and having a minimum activation voltage, the PTO relay connected to the second lead; and wherein the enabling output signal provides a voltage to the PTO relay above the minimum activation voltage when the temperature switch is in the open state and a voltage below the minimum activation voltage when the temperature switch is in the closed grounded state.

7. The as set forth in claim 6 wherein the resistor comprises a thermistor to limit power dissipation when the temperature switch is in the closed grounded state.

8. The invention as set forth in claim 6 including a wait indicator connected to a wait indicator timer for providing a preselected wait time interval indication when the temperature switch changes from the open state to the closed state, wherein the wait indicator timer is connected by a first diode to the temperature switch.

9. The invention as set forth in claim 8 wherein the second lead of the resistor is connected by a second diode to the temperature switch.

10. The invention as set forth in claim 8 further including a relay socket for mounting a temperature relay, and wherein the first diode is connected to the socket.

* * * * *